United States Patent
Jones et al.

(10) Patent No.: US 11,050,505 B1
(45) Date of Patent: Jun. 29, 2021

(54) SYSTEM AND METHOD FOR RECEIVING MULTI-POLARIZED SIGNALS

(71) Applicant: General Dynamics Mission Systems, Inc., Fairfax, VA (US)

(72) Inventors: Nathaniel Jones, Florham Park, NJ (US); Stephanie Novak, Florham Park, NJ (US); Edward Rowe, Florham Park, NJ (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 0 days.

(21) Appl. No.: 16/791,249

(22) Filed: Feb. 14, 2020

(51) Int. Cl.
*H04J 14/06* (2006.01)
*G01J 4/04* (2006.01)
*H04L 27/227* (2006.01)
*G06K 9/62* (2006.01)
*H04B 10/61* (2013.01)
*H04B 10/2507* (2013.01)

(52) U.S. Cl.
CPC ........... *H04J 14/06* (2013.01); *G01J 4/04* (2013.01); *G06K 9/6223* (2013.01); *H04L 27/227* (2013.01); *H04B 10/2507* (2013.01); *H04B 10/61* (2013.01)

(58) Field of Classification Search
CPC ..... H04J 14/06; H04L 27/227; G06K 9/6223; G01J 4/04; H04B 10/079; H04B 10/2507; H04B 10/61
USPC .......................................................... 398/65
See application file for complete search history.

(56) References Cited

U.S. PATENT DOCUMENTS

| | | | |
|---|---|---|---|
| 6,856,710 B2 * | 2/2005 | Wein | H04B 10/2569 385/11 |
| 9,485,019 B1 * | 11/2016 | Kim | H04B 10/07957 |
| 9,768,875 B2 * | 9/2017 | Zhuge | H04B 10/532 |
| 9,794,092 B1 * | 10/2017 | Isautier | H04B 10/6161 |
| 10,122,489 B2 * | 11/2018 | Nakashima | H04J 14/06 |
| 2014/0369684 A1 * | 12/2014 | Cai | H04B 10/2569 398/65 |
| 2015/0280856 A1 * | 10/2015 | Nakashima | H04B 10/6162 398/65 |
| 2016/0204894 A1 * | 7/2016 | Dong | H04B 10/69 398/65 |
| 2017/0019193 A1 * | 1/2017 | Pratt | H04B 7/0851 |
| 2017/0250776 A1 * | 8/2017 | Morsy-Osman | H04J 14/06 |
| 2019/0181950 A1 * | 6/2019 | Ishimura | H04B 10/25 |
| 2019/0379462 A1 * | 12/2019 | Razzell | H04B 10/614 |
| 2020/0195354 A1 * | 6/2020 | Perin | H04B 10/6151 |

* cited by examiner

*Primary Examiner* — Abbas H Alagheband
(74) *Attorney, Agent, or Firm* — LKGlobal | Lorenz & Kopf, LLP

(57) ABSTRACT

An optical communication system is configured to transmit and receive at least four multiplexed, differently-polarized, optically-transmitted signals. Each signal is associated with a predefined state of polarization. An optical transmitter is configured to transmit multiplexed, differently polarized, optically transmitted signals. An optical receiver is configured to receive the optically transmitted signals. The system includes a multi-polarization analyzer circuit configured to obtain an analyzed signal for each of the polarized signals in Stokes space. The analyzer circuit is configured to determine if the multiplexed signal has been transformed by extreme polarization-dependent loss (PDL), the receiver correcting for the extreme polarization-dependent loss.

20 Claims, 3 Drawing Sheets

SYSTEM AND METHOD FOR RECEIVING MULTI-POLARIZED SIGNALS

STATEMENT OF GOVERNMENT INTEREST

The invention was made with Government support. The Government has certain rights in the invention.

TECHNICAL FIELD

The present disclosure relates to a system configured to transmit and receive multi-polarized light signals, and more particularly to an optical system, configured to transmit multi-polarized signals, and a receiver configured to receive optical multi-polarized signals over a communication link which induces errors in the signal.

BACKGROUND

Fiber-optic communication allows for the transmission of information from one place to another by sending light through an optical fiber. By polarizing the light within these optical fibers, it is known that multiple signals can be simultaneously sent through the same optical fiber. Unfortunately, due to optical properties of the fiber optic lines and couplings within the system, there are limitations to the data transmission speeds (bit rates), as well as a limit on the number of signals which can be sent though a single fiber simultaneously.

In one transmission signal form, namely digitally-measurable polarization-multiplexed signals, errors can occur in phase shift keyed coherent optical signals under conditions of polarization-dependent loss (PDL). It would therefore be advantageous to develop a system configured to overcome both low and extreme polarization-dependent loss to allow for an increase in the number and quality of signals transmitted through an optical fiber.

SUMMARY

The present disclosure relates to an optical system, configured to communicate optically over a communication link. The system includes an optical transmitter, configured to generate and multiplex at least four independent data signals having different states of polarization into a multiplexed signal, and an optical receiver, configured to receive the transmitted signal. The receiver includes a demultiplexer for demultiplexing the multiplexed signal into four or more signals. The receiver further includes at least four signal detectors and a compensation circuit configured to compensate for extreme polarization-dependent loss (PDL) (over 30%) to make the signal discernable.

According to the present teaching, the compensation circuit can include a Stokes analyzer for compensation of extreme polarization-dependent loss (PDL). The compensation circuit is configured to both rotate and translate the signals in Stokes space.

The present teaching utilizes a circuit which has a Stokes-space polarization demultiplexer that separates dual polarizations present in a digitally-measured polarization-multiplexed phase shift keyed coherent optical signal under conditions of extreme polarization-dependent loss (PDL). Extreme polarization-dependent loss shifts the centroid of a phase-shift-keyed signal structure in Stokes space.

In one embodiment, the receiver is configured to receive at least four multiplexed, differently polarized signals. The receiver also includes a compensation circuit, configured to compensate for induced polarization effects during transmission. The compensation takes into account the full Stokes space, allowing exact rotation compensation on the Poincare sphere for the multiplexed, differently polarized signals.

The compensation circuit may be a digital signal processor or an application specific integrated circuit, configured to perform polarization tracking that compensates for the channel-induced polarization rotation. The polarization tracking accounts for the compensation of the Poincare sphere rotation after channel propagation.

In the present teachings the number of tracked Stokes vectors is at least four, the number depending on the number of signals, hence allowing exact rotation compensation on the Poincare sphere to improve signal discrimination. Therefore, in the presently disclosed teachings, the compensation circuit comprises calculating at least four Stokes vectors and (real-time) polarization tracking the at least four vectors.

As a consequence of the above mentioned system, at least four Stokes vectors allow exact rotation compensation of a plurality of signals on a Poincare sphere, the present teachings also relate to the receiver further having a demodulation circuit for demodulating the received differently polarized signals based on the analyzed signals, wherein the analyzed signals are in Stokes space.

The system includes a receiver, configured to receive at least four multiplexed, differently polarized signals, each signal associated with a predefined state of polarization. The receiver has a multi-polarization analyzer for obtaining an analyzed signal for each of the polarized signals, in Stokes space.

The receiver according to the present teachings, further includes a compensation circuit configured to compensate for induced polarization effects during transmission.

The receiver, and more specifically the compensation circuit according to the present teachings, include a calculating circuit for calculating at least four Stokes vectors and polarization tracking of the at least four vectors. The receiver according to any of the preceding items, further includes a demodulation circuit for demodulating the received differently polarized signals based on the analyzed signals, in Stokes space.

The present teachings may be used in a wide range of communication situations, including multiplexed optical signals on fiber optic-based communication systems, including active optical cables, free space optical communication, and integrated photonic chips.

DESCRIPTION OF DRAWINGS

The teachings will in the following be described in greater detail with reference to the drawings. The drawings are exemplary and are intended to illustrate some of the features of the present method and unit and are not to be construed as limiting to the presently disclosed teachings.

DETAILED DESCRIPTION

Figure 1:
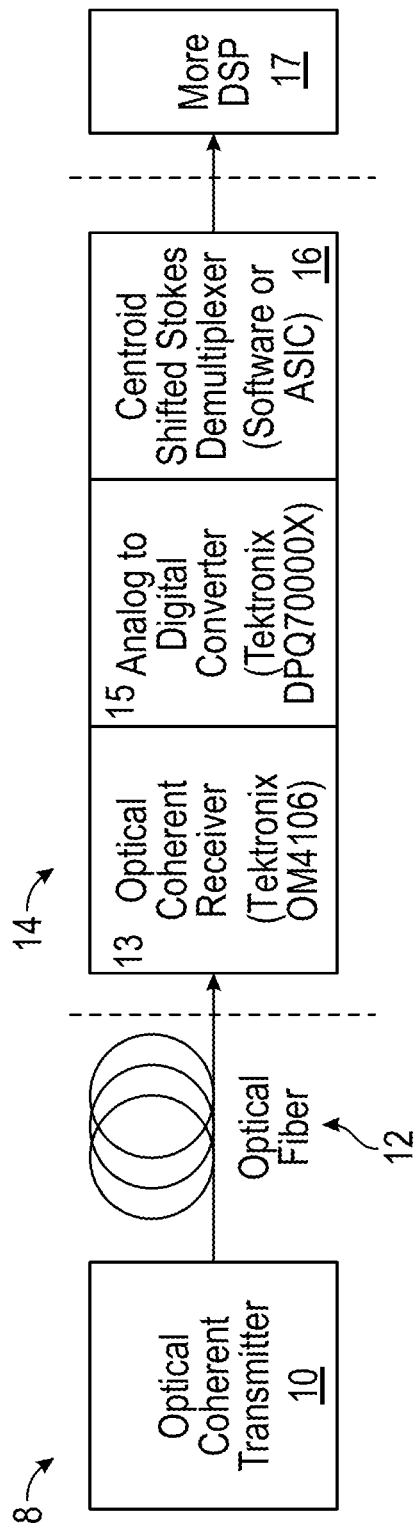
FIG. 1 shows an example of a communication system according to the present teachings.

According to the present teachings, FIG. 1 represents an optical transmission system 8, including a transmitter 10 configured to produce at least four multiplexed, differently polarized, optically transmitted signals. Coupled to the optical transmission system 10 is a transmission medium 12, for example an optical fiber, which induces translation and rotation errors in the form of induced polarization effects during transmission of the transmitted signals. Coupled to the transmission medium 12 is a receiver 13 configured to receive the at least four multiplexed, differently polarized, optically transmitted signals which have undergone induced translation and rotation of induced polarization effects caused by the transmission medium.

The receiver 13 is an optical receiver, and the signal is an optically transmitted signal. The induced polarization effects may be fiber-induced effects, and/or polarization rotation, and/or non-linear polarization rotation. The receiver 13 includes a generalized multi-polarization analyzer at the electronic demultiplexer stage. The receiver 13 receives the combined signal after transmission (composed of N multiplexed signals having polarization rotation due to the transmission medium), and splits them. The receiver 13 further evaluates the signal's components on the Poincare sphere.

Figure 2:
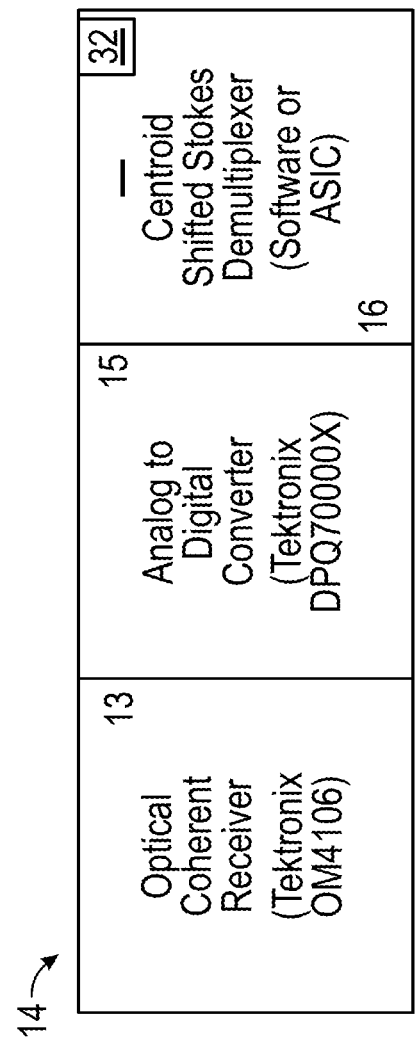
FIG. 2 shows a schematic diagram of a receiver according to the present teachings, including demultiplexing of a signal subjected to extreme polarization-dependent loss (PDL), detectors and a digital signal processor.

FIG. 2 shows an example of a configuration of a receiver according to the present teachings. This receiver can be by way of non-limiting example, a Tektronix OM 4101 14, which can include an Analog to Digital converter 15 such as a Tektronix DPO 70000X. The receiver can also include a Centroid Shifted Stokes Demultiplexer of a multi-polarized signal. The receiver 13 accepts the combined phase shifted multiplexed signal after transmission (composed of N multiplexed signals having polarization rotation due to the transmission medium), and splits them into individual signals for processing. A digital signal processor or DSP module 16 in the compensation circuit performs polarization tracking and demodulation on each of these signals. This FIG. 2 presents a coherent receiver that performs projections on the Poincare sphere used for the polarization demultiplexing of the N original signals.

The disclosed Centroid Shifted Stokes system preferably utilizes a heterodyne coherent 90-degree hybrid receiver 13 at the receiving end in order to obtain all the information it needs about the signal. By way of non-limiting example, this receiver can be an Optoplex 90 deg Optical Hybrid—QPSK Demodulator. The combination of the incoming signal with a local oscillator of similar (but not necessarily identical) frequency/wavelength allows the measurement of four separate optical signals and conversion to electrical measurement to access the four components of the complete signal.

These components of the signal are: the in-phase component of the horizontal polarization (Xi), the quadrature component of the horizontal polarization (XQ), the in-phase component of the vertical polarization (YI), and the quadrature component of the vertical polarization (YQ). The components provide the necessary polarization information to perform clustering as described below. An extremely high speed polarimeter (>100 GSps) could theoretically also provide the information needed to perform.

The receiver 13 includes a compensation circuit 16 which performs the Centroid Shifted Stokes demulitiplexing configured to compensate for the translation and rotation of induced polarization effects during transmission and returns the signal to a predefined state of polarization. In this regard, the compensation circuit 16 is configured to compensate for extreme polarization-dependent loss (PDL) in the transmitted signals. Each of the received signals is associated with a predefined state of polarization. The receiver 13 includes multi-polarization analyzer circuit 32 that is configured to obtain and analyze the received signals and evaluate the received signals in Stokes space. The optical receiver 13 includes a compensation circuit 16 configured to compensate for translation and rotation of induced polarization effects during transmission and return the signal to a predefined state of polarization.

Figure 3:
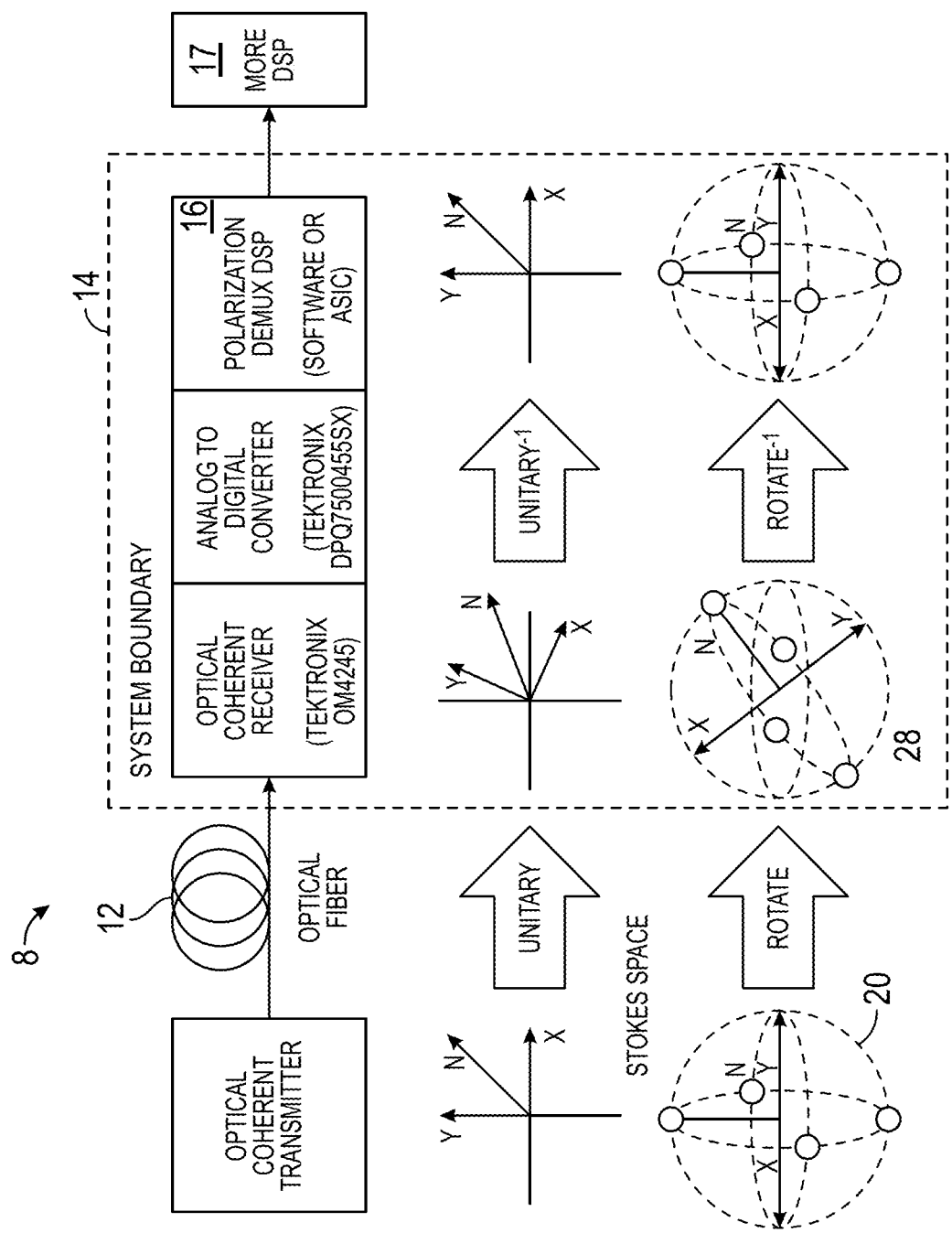
FIG. 3 shows the transformation of low polarization-dependent loss (PDL) according to the present teachings.
Figure 4:
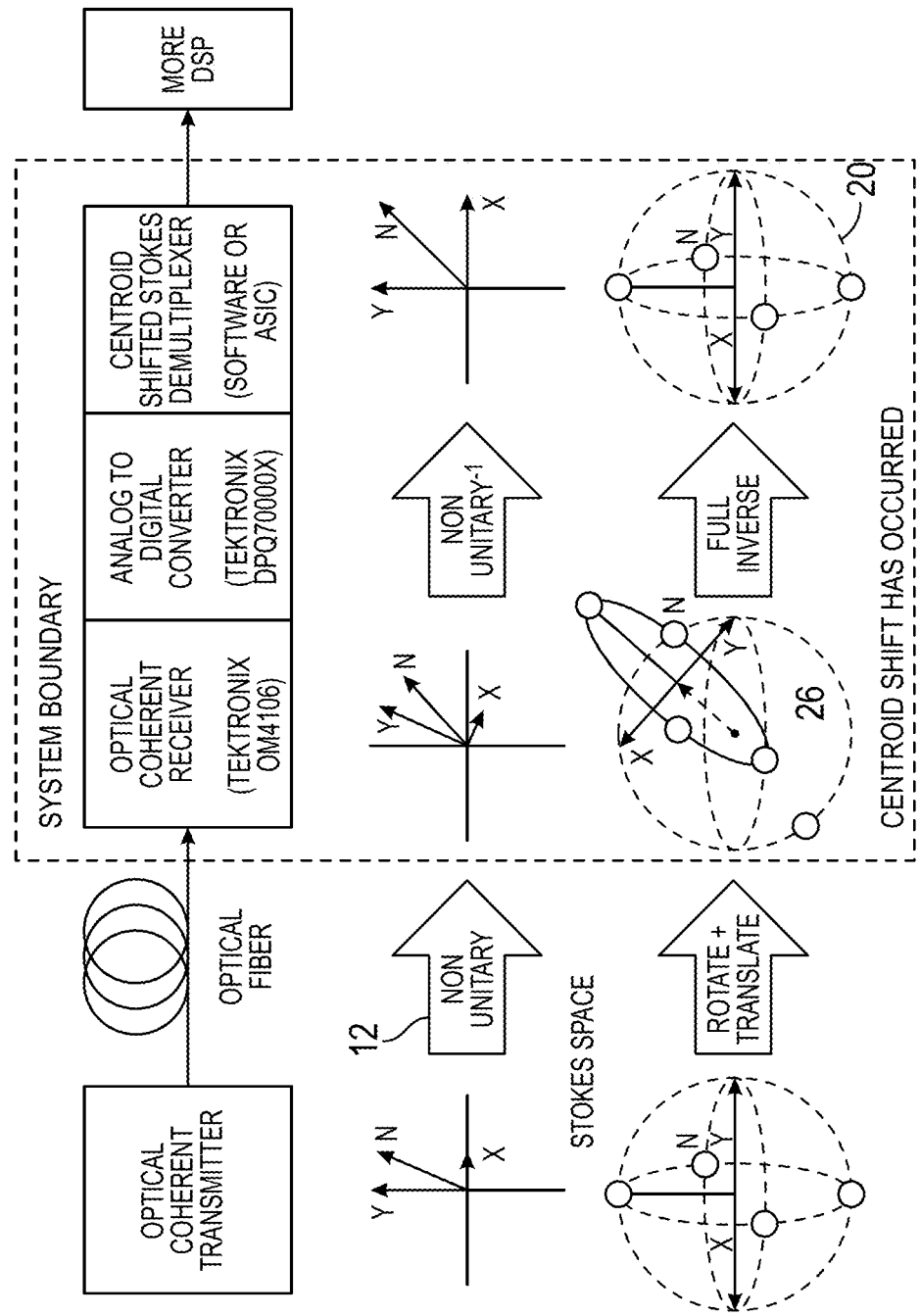
FIG. 4 shows the transformation of extreme polarization-dependent loss (PDL) according to the present teachings.

FIGS. 3 and 4 represent the evaluation of low polarization-dependent loss and extreme polarization-dependent loss respectively. When a coherent receiver measures the in-phase and quadrature components of a polarization multiplexed signal, a multi-polarization analyzer 32 in the system computes the Stokes parameters of each sample. Using a clock recovery technique, the samples, normalized by average intensity, form a set of clusters, equal in number to the order of the modulation format. For formats of order 3 and higher, these clusters define a unique plane in Stokes space.

As shown in FIG. 3, if the power on the X and Y polarizations is roughly equal (low polarization-dependent loss), the positive and negative unit normal vectors associated to this plane, centered at the origin, are the measured Stokes-Space locations of the X and Y polarizations. The Centroid Shifted Stokes Demultiplexer (CSS) determines the best fit plane of the sampled signal, and compensates for polarization-dependent loss by centering the plane's normal vectors at the centroid of the signal structure (the 3-dimensional mean of the measured samples). In FIG. 4, instead of using the positive and negative normal vectors of the plane (centered at the origin), CSS finds the points where the positive and negative normal vectors of the best fit plane (centered at the signal structure centroid) intersect the unit-radius Poincaré sphere. The resulting coordinates are unit vectors centered at the origin describing the effective locations of the X and Y polarizations under extreme polarization-dependent loss. This measurement is used to recover the signal.

When the channel transfer function includes both a rotation and translation (is not unitary), standard demultiplexing techniques are ineffective. The Centroid Shifted Stokes polarization demultiplexer measures current State of Polarization with respect to the translated coordinate system, allowing polarization multiplexed signals experiencing high polarization-dependent loss to be successfully recovered and demultiplexed into their X and Y components.

As noted above, the compensation circuit 16 has a multi-polarization analyzer 32 configured to calculate a plurality of Stokes vectors associated with the received signals and calculate a translation vector that is used to compensate for translation and rotation caused by induced polarization effects during transmission and return the signal to a predefined state of polarization. The receiver 13 further includes a demodulation circuit 17 configured to demodulate the received differently polarized signals based on the analyzed signals. The demodulation circuit includes a predefined multiple-input multiple-output process.

As described below, the compensation circuit 16 is configured to define a series of clusters for the received signals that is determined using clustering algorithms in Stokes space 20. The algorithm can be, for example, one of K-means clustering or principle component analysis (PCA). The compensation circuit 16 then determines four or more locations for the multiplexed signals in Stokes space, and defines a best fit plane 24 through the centroid of clusters of the four or more measured signals based on the four or more locations of these clusters.

The compensation circuit 16 then determines an offset vector 26 through the center of clusters, which also passes through the center of the Poincare sphere 28 in Stokes space. The offset vector 26 shown, is indicative of translation of the multiplexed signals in Stokes space in relation to the Poincare sphere. Lastly, the compensation circuit 16 identifies the X and Y polarizations of the incoming signal based on the vectors normal to the best fit plane centered at the centroid of clusters. In this regard, the rotation and translation of the multiplexed signals in Stokes space in relation to a Poincare sphere occurs through matrix manipulation of an incoming signal. The transformation is conducted based on the following, where xi, yi represent the Stokes parameters of the X and Y polarizations and J represents the transfer function experienced by the optical signal in the transmission medium 12, which is inverted and applied to the incoming signal:

$$S_x = \begin{bmatrix} x_1 \\ x_2 \\ x_3 \end{bmatrix}$$

$$S_y = \begin{bmatrix} y_1 \\ y_2 \\ y_3 \end{bmatrix}$$

$$J = \begin{bmatrix} \cos(\alpha) & \cos(\beta)e^{i\eta} \\ -\sin(\alpha)e^{-i\delta} & -\sin(\beta) \end{bmatrix}$$

$$\alpha = \frac{\cos^{-1}(x_1)}{2}$$

$$\delta = a\tan2(x_3, -x_2)$$

$$\beta = \frac{\cos^{-1}(y_1)}{2}$$

$$\eta = a\tan2(y_3, -y_2)$$

As shown, the optical receiver 13, is configured to receive at least four multiplexed, differently polarized, optically transmitted coherent signals having a wavelength suitable for fiberoptic based communication. The measured states of polarization of the signals are represented by a matrix capable of recovering the received signals. The induced polarization effects are fiber-induced effects, including polarization rotation, and polarization translation on a Poincare sphere (see FIGS. 3 and 4).

The difference between the first (FIG. 3) and second (FIG. 4) methods of demultiplexing—is that the matrix measured and used for polarization demultiplexing is unitary when only rotation is considered. When translation is considered as well, the matrix is non-unitary. Centroid Shifted Stokes can measure and demultiplex when the matrix is extremely non-unitary, for instance when one of the two multiplexed polarizations loses up to 95% of its optical power.

To effect the Centroid Shifted Stokes polarization demultiplexing the system utilizes a circuit which can be a processor or FPGA as a Stokes-space polarization demultiplexer, that separates the multiple polarized signals present in a digitally-measured polarization-multiplexed phase shift keyed coherent optical signal under conditions of extreme polarization-dependent loss (PDL). As shown in FIG. 4, extreme polarization-dependent loss shifts the centroid of a phase-shift-keyed signal structure in Stokes space.

In the detector 13, the in-phase and quadrature signals are measured to determine the amount of line induced error. By way of example, for a QPSK signal, a series of clusters for the signals is determined using clustering algorithms in Stokes space. By way of non-limiting example, K-means clustering or principle component analysis can be run on the detected signals within Stokes space to determine the rotation and translation of the signals in Stokes space. Based on the four or more locations of these clusters, a best fit plane is defined through the centroid of the clusters. Then a vector that is normal to this plane is defined, which passes through the Poincare sphere in Stokes space. There will be two vectoral solutions passing through the centroid. The solutions are utilized to calculate a transfer matrix which, in turn, is used to convert the detected signals so that power is equalized.

The circuit 16 conducts translations in an integrated circuit or in software from the values from coherent measurements using the digital signal processor. If the best fit plane passes through the origin in Stokes space, the demultiplexer only rotates the signal such that when rotated the signals have equal power.

In the extreme PDL situations, the best fit plane is calculated and, if it is no longer centered along the origin, the polarization demultiplexing algorithm accounts for this shift. A transfer function is constructed in the form of a non-unitary matrix which allows the conversion of the detected signals in single step.

According to the present teachings described is a method for converting a multiplexed optical communication signal. Upon receiving at least four multiplexed, differently polarized, optically transmitted signals, a multiplexed analyzed signal is obtained for said polarized signals and evaluated in Stokes space. The amount of translation and rotation of the plurality of signals is determined in Stokes space, and the multiplexed signal is transformed as described above. In extreme polarization-dependent loss situations the best fit plane is calculated; and if it is no longer centered along the origin, a polarization demultiplexing algorithm is used to shift and rotate the signal in Stokes space.

In the receiver 13 circuit, the optical signal is split in four parts. Three of them can, for example, end with vertical, horizontal and circular polarizers, respectively, while the fourth part is the degree of polarization (generally 1). These are the Stokes parameters. Any given signal is transformed into a set of points on the sphere that is calculated using the multi-polarization analyzer 32.

The multi-polarization analyzer is responsible for detecting signal components along predefined polarization axes. The signal components are transferred into a four-dimensional Stokes space in the receiver. This results in a low computational load which makes implementation possible in, for example low-speed digital processors. In the receiver 13, the measured states of polarization of the signals are represented by a conversion matrix capable of recovering the received signals In a further embodiment of the present teachings, the receiver includes at least four signal detectors. The detectors may be, for example, four pairs of photodiodes. In one embodiment of the presently disclosed system for optical communication over a communication link, the system is a coherent system.

With the proposed solution it is possible to multiplex the multi-polarized signals into a shared channel, for example fiber-optic data link, and compensate for channel-induced polarization effects. Therefore, preferably the transmitter works with a receiver as described above, and the transmitted signals may be optically transmitted signals.

In one embodiment of the present teachings the receiver in the system is the receiver as described above, i.e. configured to receive at least four multiplexed, differently polarized signals, each signal associated with a predefined state of polarization. The receiver includes a multi-polarization analyzer for obtaining an analyzed signal for each of the polarized signals in Stokes space. The receiver may also include a compensation circuit, configured to compensate for induced polarization effects during transmission, using the data in Stokes space.

The system may be used for a wide range of applications. The system may be an optical communication system, such as a fiber link or a freespace link, wherein the transmitter comprises at least one light source, such as a laser diode. However, the system may also be an RF system or a combination (radio-over-fiber, microwave photonics).

The present teachings also relate to an active cable including a receiver according to the presently disclosed teachings and/or a transmitter according to the presently disclosed teachings, or a system according to the presently disclosed teachings. Active cables are cables for transmission including integrated photonic chips on the transmitter and receiver side, used for example for inter-rack and intra-rack connections in datacenters. Active optical cable is a cabling technology that accepts same electrical inputs as a traditional copper cable but uses optical fiber between the connectors.

Active optical cables use electrical-to-optical conversion on the cable ends to improve speed and distance performance of the cable without sacrificing compatibility with standard electrical interfaces. The cable may include one or more optical fibers and optoelectric modules at the ends of the cable. The active optical cable may also have several/receivers/transmitters at each end.

It can be seen that the optical phase is exploited as an independent parameter by encoding at least part of the information using phase-shift keying. This particular configuration (along with the corresponding one at the receiver side) makes demultiplexing possible for a plurality of different signals that now can be simultaneously transmitted over the same medium.

Various implementations of the systems and methods described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including circuits that include at least one programmable processor, which may be special or general purpose, coupled to receive data and instructions from, and to transmit data and instructions to, a storage system, at least one input device, and at least one output device.

These computer programs (also known as programs, software, software applications, scripts, or program code) include machine instructions, for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. A propagated signal is an artificially generated signal, e.g., a machine-generated, optical, or electromagnetic signal that is generated to encode information for transmission to suitable receiver apparatus.

The processes and logic flows described in this specification can be performed by one or more programmable circuits or processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

In the foregoing description, the teachings have been described with reference to specific exemplary embodiments thereof. It will be apparent to those skilled in the art that a person understanding these teachings may conceive of changes or other embodiments or variations, which utilize the principles of this teachings without departing from the broader spirit and scope of the teachings. The specification and drawings are, therefore, to be regarded in an illustrative rather than a restrictive sense.

The invention claimed is:

1. An optical receiver comprising:
   a receiver circuit configured to receive a plurality of signals including at least four multiplexed, differently-polarized, optically-transmitted signals having a wavelength suitable for fiberoptic based communication, each of the optically-transmitted signals associated with a predefined state of polarization;
   a multi-polarization analyzer circuit configured to determine from the plurality of signals one of a rotation and a translation of the transmitted multiplexed signals in Stokes space;
   a compensation circuit configured to convert at least one of the plurality of signals into Stokes space, calculate a plurality of Stokes vectors, compensate for translation and rotation of induced polarization effects in the at least one of the plurality of signals during transmission, and return each of the plurality of signals to a predefined state of polarization based on the calculated Stokes vectors, wherein the compensation circuit is configured to calculate an offset vector that is indicative of the rotation and translation of the transmitted multiplexed signals in Stokes space in relation to a Poincaré sphere.

2. The optical receiver according to claim 1, wherein the compensation circuit is configured to calculate the plurality of Stokes vectors and calculate the translation vector that is used to compensate for translation and rotation of induced polarization effects during transmission using a non-unitary matrix and return the plurality of received differently: polarized signals to a predefined state of polarization.

3. The optical receiver according to claim 2, further comprising a demodulation circuit configured to demodulate the plurality of signals based on the plurality Stokes vectors and the translation vector.

4. The optical receiver according to claim 3, wherein the demodulation circuit comprises a predefined multiple-input multiple-output process.

5. The optical receiver according to claim 4, further configured to receive and demodulate the plurality of signals coherently.

6. The optical receiver according to claim 1, further comprising a demultiplexer configured to demultiplex the plurality of signals.

7. The optical receiver according to claim 1, further configured to represent the measured states of polarization of the plurality of signals using a matrix capable of transforming the plurality of signals from the full Stokes space.

8. The optical receiver according to claim 1, wherein the induced polarization effects are fiber-induced effects, including polarization rotation, and polarization translation on a Poincaré sphere.

9. The optical receiver according to claim 8, wherein the compensation circuit comprises a digital signal processor for applying a non-unitary matrix of coefficients to the plurality of signals.

10. An optical transmission system, comprising:
a transmitter configured to transmit a plurality of signals including at least four multiplexed, differently-polarized, optically-transmitted signals;
a transmission medium configured to transmit the plurality of signals from the transmitter coupled at a first end to a second end of the transmission medium, wherein transmission of the plurality of signals in the transmission medium induces translation and rotation of induced polarization effects;
a receiver coupled at the second end of the transmission medium and configured to receive the plurality of signals, wherein at least one of said plurality of signals comprises data in Stokes space; and
a compensation circuit configured to convert at least one of the plurality of signals into Stokes space, to calculate a plurality Stokes vectors, to compensate for the translation and rotation of induced polarization effects in the plurality of signals during transmission, and return each of the plurality of signals to a predefined state of polarization based on the calculated Stokes vectors, wherein the compensation circuit is configured to determine at least four locations for the multiplexed signals in Stokes space, and based on the at least four locations, define a best fit plane through the at least four locations.

11. The optical transmission system according to claim 10, wherein the transmitter is configured to transmit at least four multiplexed, differently-polarized signals.

12. The optical transmission system according to claim 10, wherein, the compensation circuit is configured to define a series of clusters for the plurality of signals that are determined using a clustering algorithm in Stokes space.

13. The optical transmission system according to claim 12, wherein the clustering algorithm comprises one of K-means clustering or principle component analysis.

14. The optical transmission system according to claim 10, wherein the compensation circuit is configured to determine a vector normal to the best fit plane through the centroid of clusters.

15. The optical transmission system according to claim 14, wherein the compensation circuit is configured to offset the plurality of signals based on the vector normal to the best fit plane.

16. A system, configured to communicate optically over a communication link, comprising:
an optical transmitter, configured to generate and multiplex a plurality of signals including at least four independent data signals having different states of polarization into a transmitted multiplexed signal;
an optical receiver, configured to receive the transmitted multiplexed signal, the receiver comprising a demultiplexer for polarization demultiplexing the transmitted multiplexed signal into a plurality of polarized signals; and
a compensation circuit configured to compensate for the translation and rotation of induced polarization effects in the plurality of polarized signals during transmission and transform each of the plurality of polarized signals to a predefined state of polarization wherein the compensation circuit is configured to calculate an offset vector that is indicative of rotation and translation of the transmitted multiplexed signals in Stokes space in relation to a Poincare sphere.

17. The system according to claim 16, wherein the compensation circuit is configured to compensate for extreme polarization-dependent loss.

18. The system according to claim 16, wherein the rotation and translation of the multiplexed signals in Stokes space in relation to a Poincare sphere is a matrix.

19. The system according to claim 16, wherein the compensation circuit is configured to calculate a plurality of Stokes vectors and calculate a translation vector that is used to compensate for translation and rotation of induced polarization effects during transmission using a non-unitary matrix and return the plurality of received differently-polarized signals to a predefined state of polarization.

20. The system according to claim 16, wherein the compensation circuit is configured to represent measured states of polarization of the plurality of signals using a matrix capable of transforming the plurality of signals from the full Stokes space.

* * * * *